(12) United States Patent
Huang

(10) Patent No.: US 6,755,099 B2
(45) Date of Patent: Jun. 29, 2004

(54) DRIVE WRENCH STRUCTURE

(76) Inventor: Chun Po Huang, No. 41, Lane 120, Wenshinnan 3rd Rd., Nantuen Chiu, Taichung (TW), 408

( * ) Notice: Subject to any disclaimer, the term of this patent is extended or adjusted under 35 U.S.C. 154(b) by 85 days.

(21) Appl. No.: 10/215,005

(22) Filed: Aug. 9, 2002

(65) Prior Publication Data
US 2004/0025648 A1 Feb. 12, 2004

(51) Int. Cl.[7] ............................................. B25B 13/56
(52) U.S. Cl. ...................... 81/176.1; 81/451; 81/176.15
(58) Field of Search ...................... 81/451, 438, 176.1, 81/176.15, 177.85

(56) References Cited

U.S. PATENT DOCUMENTS

| | | | | |
|---|---|---|---|---|
| 1,298,324 A | * | 3/1919 | Funk | 81/451 |
| 4,569,259 A | * | 2/1986 | Rubin et al. | 81/176.15 |
| 5,003,681 A | * | 4/1991 | Schley | 81/176.1 |
| 5,182,973 A | * | 2/1993 | Martindell | 81/451 |
| 6,095,017 A | * | 8/2000 | Long | 81/176.15 |

* cited by examiner

Primary Examiner—James G. Smith

(57) ABSTRACT

A drive wrench structure includes a drive handle provided with a threaded rod which is provided with a guide rod, and a mounting stud having a first side formed with a screw bore screwed on the threaded rod of the drive handle, and a second side formed with a through hole for passage of the guide rod of the drive handle. The guide rod of the drive handle may protrude outward from the through hole of the mounting stud when in use, and may be retracted into and fully hidden in the through hole of the mounting stud when not in use, thereby protecting the guide rod of the drive handle, and thereby facilitating storage of the drive wrench structure.

8 Claims, 6 Drawing Sheets

DRIVE WRENCH STRUCTURE

BACKGROUND OF THE INVENTION

1. Field of the Invention

The present invention relates to a drive wrench structure, and more particularly to a drive wrench structure that may co-operate with a drive disk to screw a piston into a wheel cylinder or unscrewing the piston from the wheel cylinder, wherein the guide rod of the drive handle may protrude outward from the through hole of the mounting stud when in use, and may be retracted into and fully hidden in the through hole of the mounting stud when not in use, thereby protecting the guide rod of the drive handle, and thereby facilitating storage of the drive wrench structure.

2. Description of the Related Art

In general, the brake system of the automobile includes a brake pedal for operating a brake cylinder which may transmit the hydraulic oil into each wheel cylinder to push the piston in each wheel cylinder, so that the piston may push the brake lining to rub the brake disc, thereby achieving the braking purpose. When the piston is worn out, a drive wrench may be used to assemble and disassemble the piston of the wheel cylinder.

A conventional drive wrench 5 in accordance with the prior art shown in FIG. 5 has an end portion provided with a square drive head 50 that may be inserted into a square mounting hole 60 of a drive disk 6 for rotating the drive disk 6. The drive disk 6 has a periphery provided with an outer flange 61 mounted on the periphery of an end face of the piston 7, the drive disk 6 is provided with an insertion stub 62 that may be inserted into one of multiple insertion recesses 70 formed in the piston 7, for rotating the piston 7, so that the piston 7 may be screwed into the wheel cylinder, and may be unscrewed from the wheel cylinder.

However, the outer flange 61 of the drive disk 6 has a fixed diameter to fit the piston of a fixed size, so that it is necessary to change the drive disk 6 to fit pistons of different sizes, thereby causing inconvenience in use and operation. In addition, the outer flange 61 of the drive disk 6 is mounted on the periphery of the piston 7, so that the driven force arm is longer, thereby wasting the manual work in operation. Further, the outer flange 61 is protruded from the drive disk 6, so that it is easily broken due to hit by a foreign object.

As shown in FIG. 6, the drive disk 6a has a center provided with an inner flange 60a that may be inserted into a depression 71 formed in the center of the outer end face of the piston 7. In operation, when the drive wrench 5 is rotated, the insertion stub 61a may be rotated about the inner flange 60a to push the insertion recess 70 for rotating the piston 7, so that the piston 7 may be screwed into the wheel cylinder, and may be unscrewed from the wheel cylinder. Thus, the driven force arm between the inner flange 60a and the insertion stub 61a may be shortened, thereby saving the manual work. However, the inner flange 60a is protruded from the drive disk 6a, so that it is easily broken due to hit by a foreign object. In addition, the inner flange 60a is easily detach from the depression 71, thereby causing inconvenience in operation.

SUMMARY OF THE INVENTION

The present invention has arisen to mitigate and/or obviate the disadvantage of the conventional drive wrench.

The primary objective of the present invention is to provide a drive wrench structure, wherein the guide rod of the drive handle may protrude outward from the through hole of the mounting stud when in use, and may be retracted into and fully hidden in the through hole of the mounting stud when not in use, thereby protecting the guide rod of the drive handle, and thereby facilitating storage of the drive wrench structure.

In accordance with the present invention, there is provided a drive wrench structure, comprising:

a drive handle having one end provided with a threaded rod, the threaded rod having a distal end provided with a guide rod; and a mounting stud having a first side formed with a screw bore screwed on the threaded rod of the drive handle, and a second side formed with a through hole for passage of the guide rod of the drive handle, with the guide rod of the drive handle protruding outward from the through hole of the mounting stud.

Further benefits and advantages of the present invention will become apparent after a careful reading of the detailed description with appropriate reference to the accompanying drawings.

DETAILED DESCRIPTION OF THE INVENTION

Figure 1:
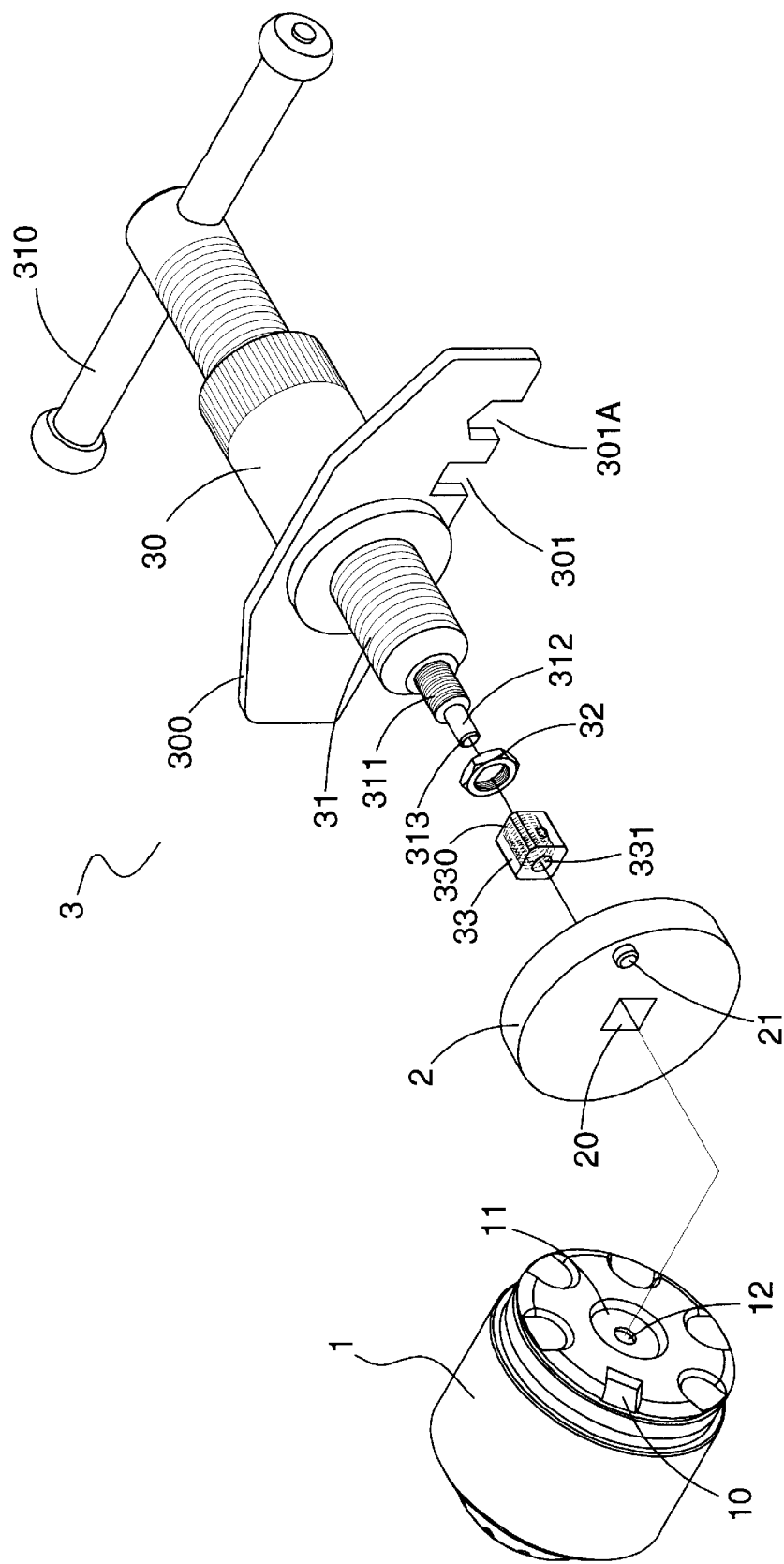
FIG. 1 is an exploded perspective view of a drive wrench structure in accordance with a preferred embodiment of the present invention.
Figure 2:
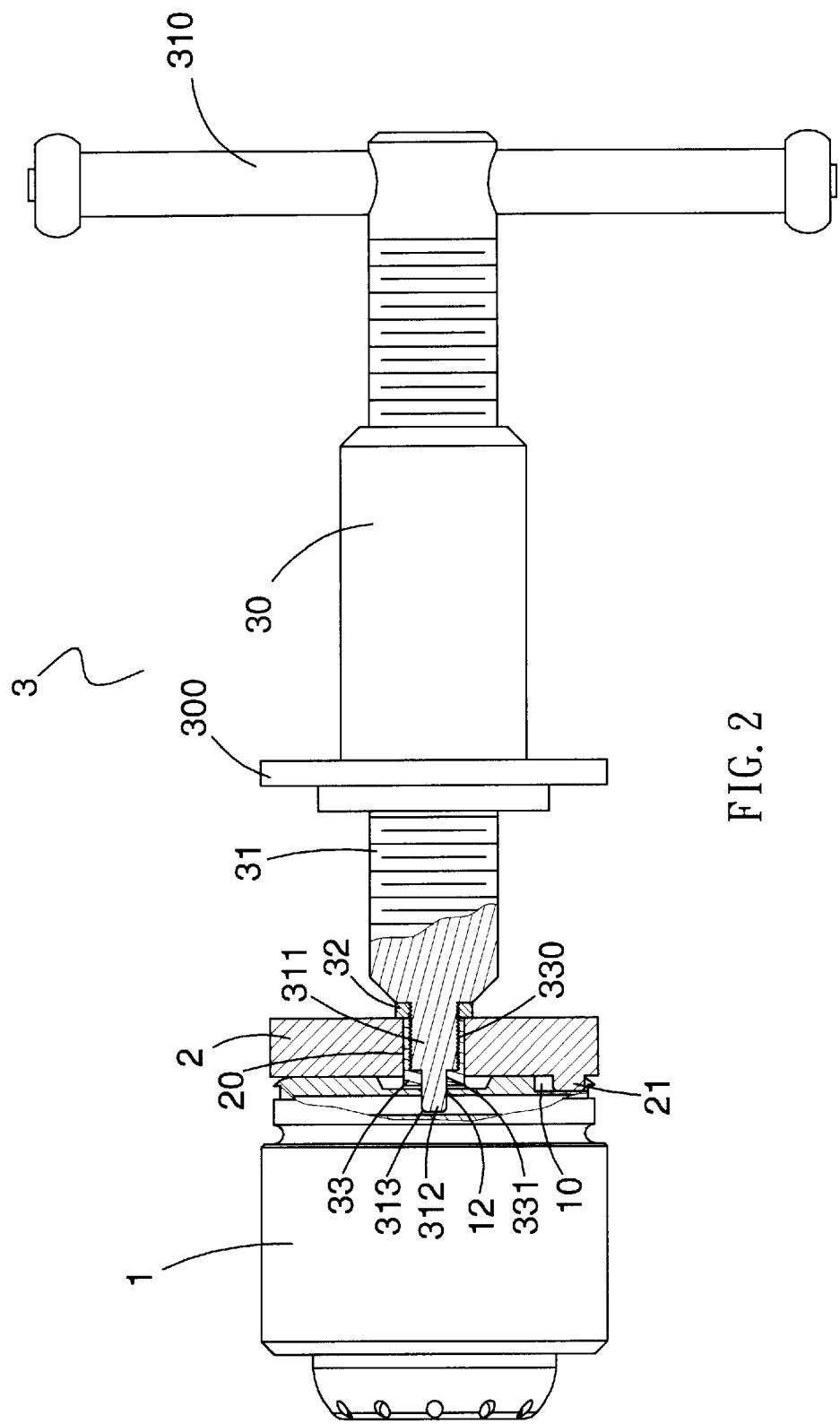
FIG. 2 is a top plan cross-sectional assembly view of the drive wrench structure as shown in FIG. 1.
Figure 3:
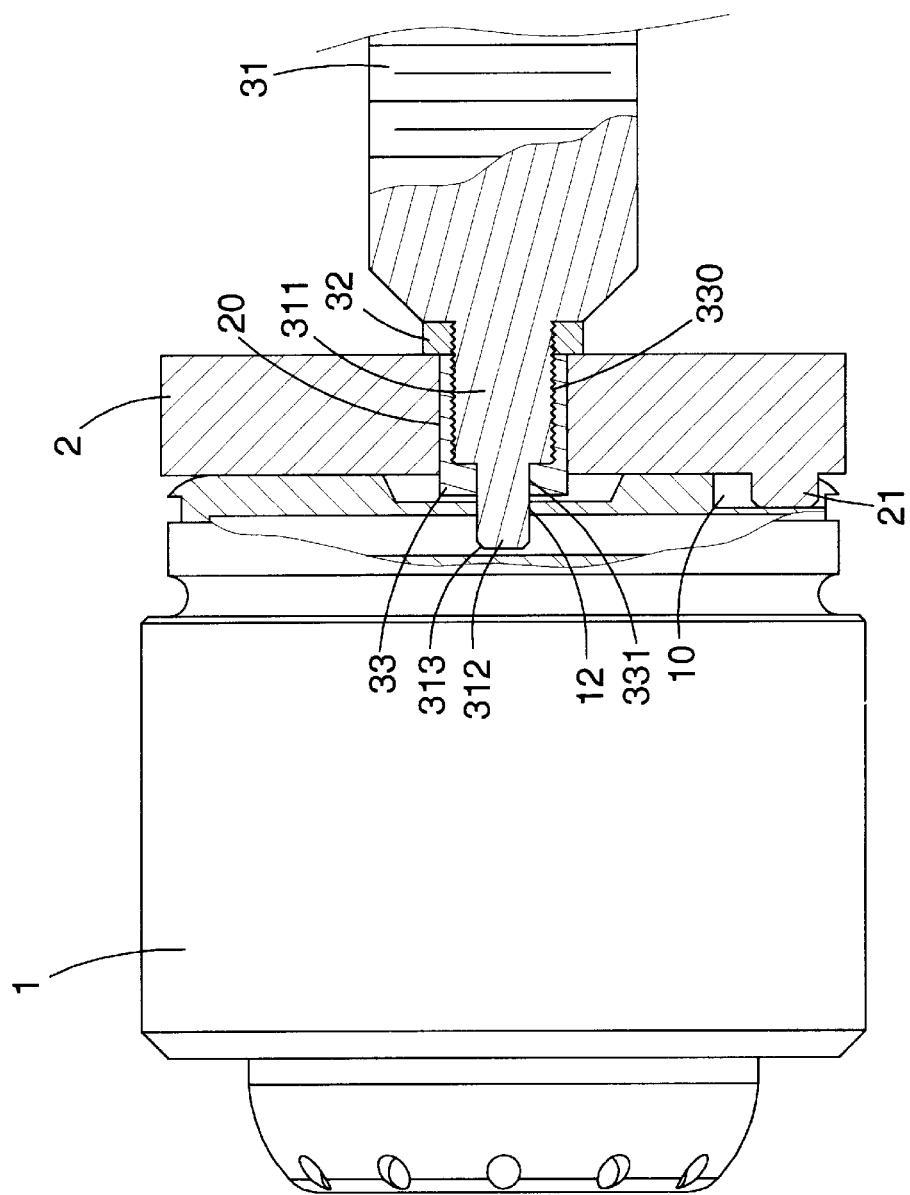
FIG. 3 is a partially cut-away enlarged view of the drive wrench structure as shown in FIG. 2.

Referring to the drawings and initially to FIGS. 1–3, a drive wrench structure 3 in accordance with a preferred embodiment of the present invention may co-operate with a drive disk 2 to screw a piston 1 into a wheel cylinder (not shown) or unscrew the piston 1 from the wheel cylinder.

The piston 1 has a first end face screwed on the wheel cylinder and a second end face having a center formed with a depression 11 and having a periphery formed with multiple insertion recesses 10. The depression 11 has a center formed with a valve opening 12.

The drive disk 2 has a center formed with a square mounting hole 20, and has a periphery provided with an insertion stub 21 that may be inserted into one of the insertion recesses 10 of the piston 1.

The drive wrench structure 3 comprises a socket 30, a drive handle 31, a positioning nut 32, and a square mounting stud 33.

The drive handle 31 is screwed in the socket 30, so that the drive handle 31 may be rotated and moved in the socket 30. The drive handle 31 has a first end provided with a threaded rod 311 and a second end provided with a force applying lever 310 for facilitating rotation of the drive handle 31.

The threaded rod 311 has a distal end provided with a guide rod 312. The guide rod 312 has a distal end formed with a tapered guide face 313.

The positioning nut 32 is screwed on the threaded rod 311 of the drive handle 31, for providing a positioning effect on the mounting stud 33.

The square mounting stud 33 has a first side formed with a screw bore 330 screwed on the threaded rod 311 of the drive handle 31, and a second side formed with a through hole 331 for passage of the guide rod 312 of the drive handle 31.

The drive wrench structure 3 further comprises a fixing plate 300 mounted on the drive handle 31 and rested on the socket 30, so that the drive wrench structure 3 may be mounted on the outer side of the wheel cylinder. The fixed plate 300 is formed with a square recess 301 and a semi-hexagonal recess 301A. Thus, when the fixing plate 300 is detached from the drive handle 31, the fixing plate 300 may be used to rotate the square mounting stud 33 by the square recess 301 of the fixing plate 300, and may be used to rotate the positioning nut 32 by the semi-hexagonal recess 301A.

Referring to FIGS. 2 and 3 with reference to FIG. 1, the positioning nut 32 is screwed on the threaded rod 311 of the drive handle 31, and is located on the root portion of the threaded rod 311 of the drive handle 31.

Then, the square mounting stud 33 is screwed on the threaded rod 311 of the drive handle 31, and is rested on the positioning nut 32, with the guide rod 312 of the drive handle 31 protruding outward from the through hole 331 of the square mounting stud 33. Then, the mounting hole 20 of the drive disk 2 is mounted on the square mounting stud 33, with the guide rod 312 of the drive handle 31 protruding outward from the mounting hole 20 of the drive disk 2. Then, the drive disk 2 may be mounted on the piston 1, so that the guide rod 312 of the drive handle 31 may be inserted into the valve opening 12 of the piston 1 by guidance of the guide face 313 of the guide rod 312 of the drive handle 31, while the insertion stud 21 of the drive disk 2 may be inserted into one of the insertion recesses 10 of the piston 1.

Thus, when the drive handle 31 of the drive wrench structure 3 is rotated, the drive disk 2 may be driven by the square mounting stud 33 to rotate about the guide rod 312 of the drive handle 31, so that the insertion stud 21 of the drive disk 2 may be moved to push the insertion recesses 10 of the piston 1 so as to rotate the piston 1, thereby screwing the piston 1 into the wheel cylinder or unscrewing the piston 1 from the wheel cylinder.

Figure 4:
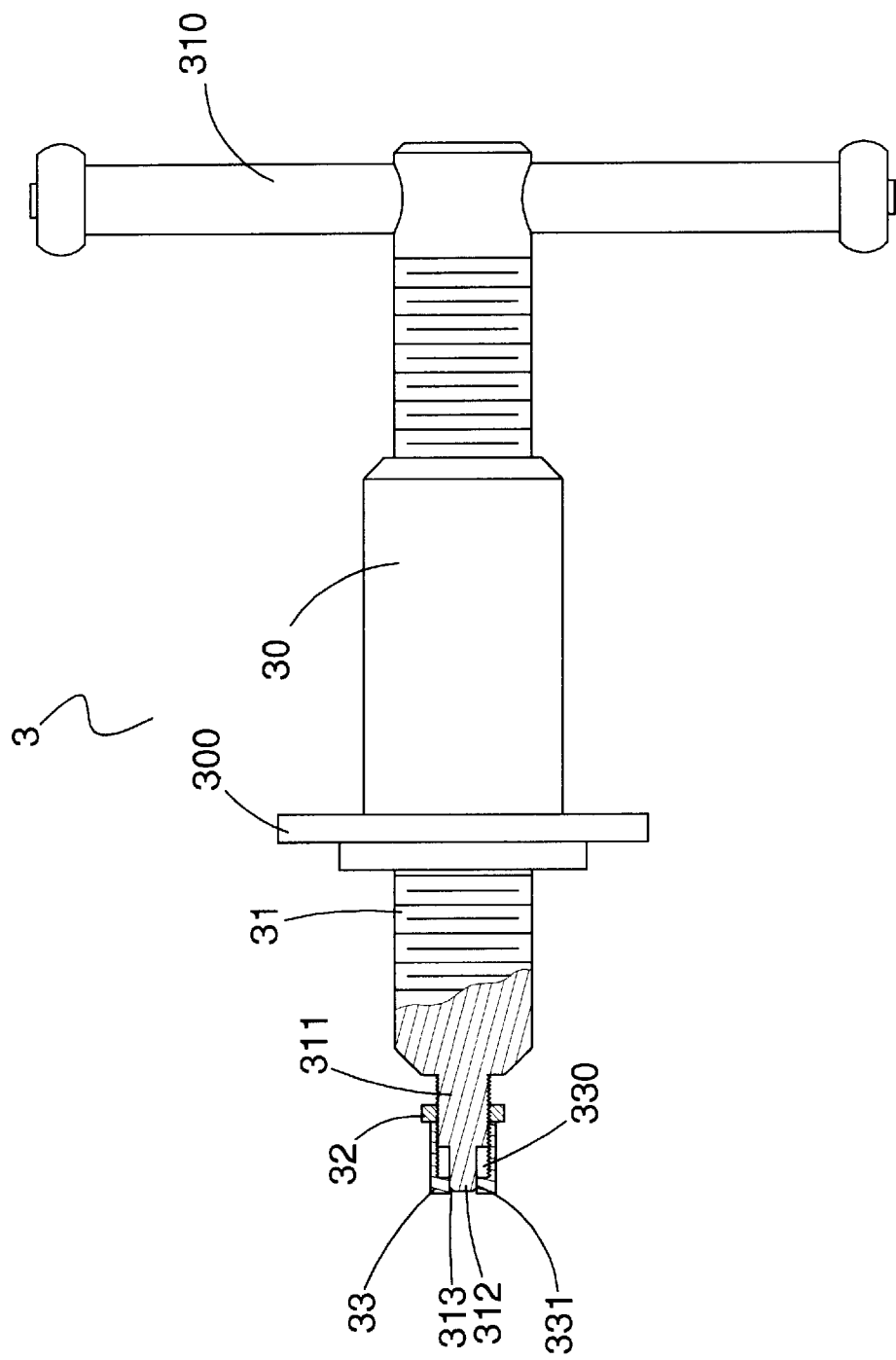
FIG. 4 is a schematic operational view of the drive wrench structure as shown in FIG. 2 when not in use.
Figure 5:
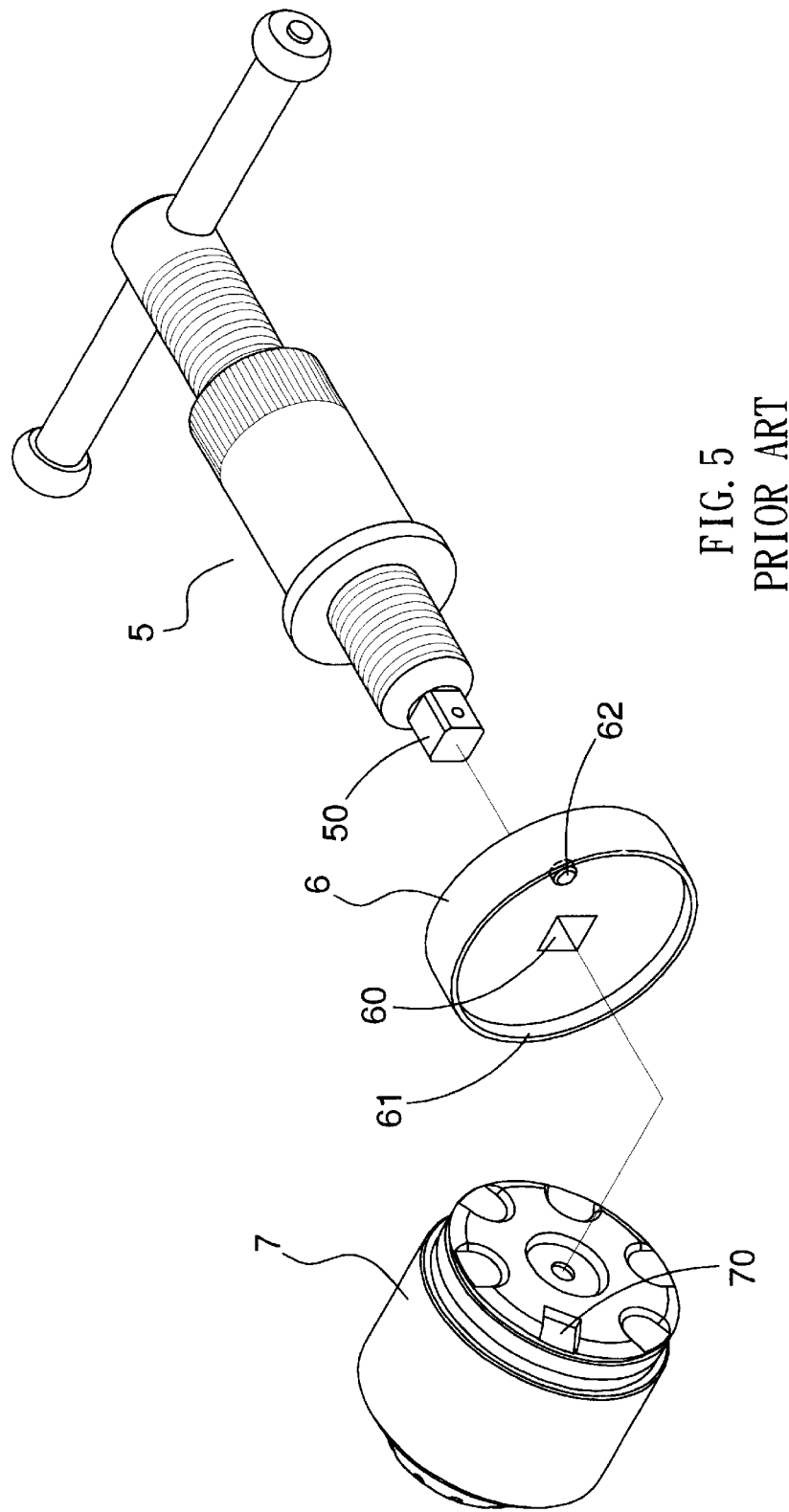
FIG. 5 is a perspective view of a conventional drive wrench structure in accordance with the prior art.
Figure 6:
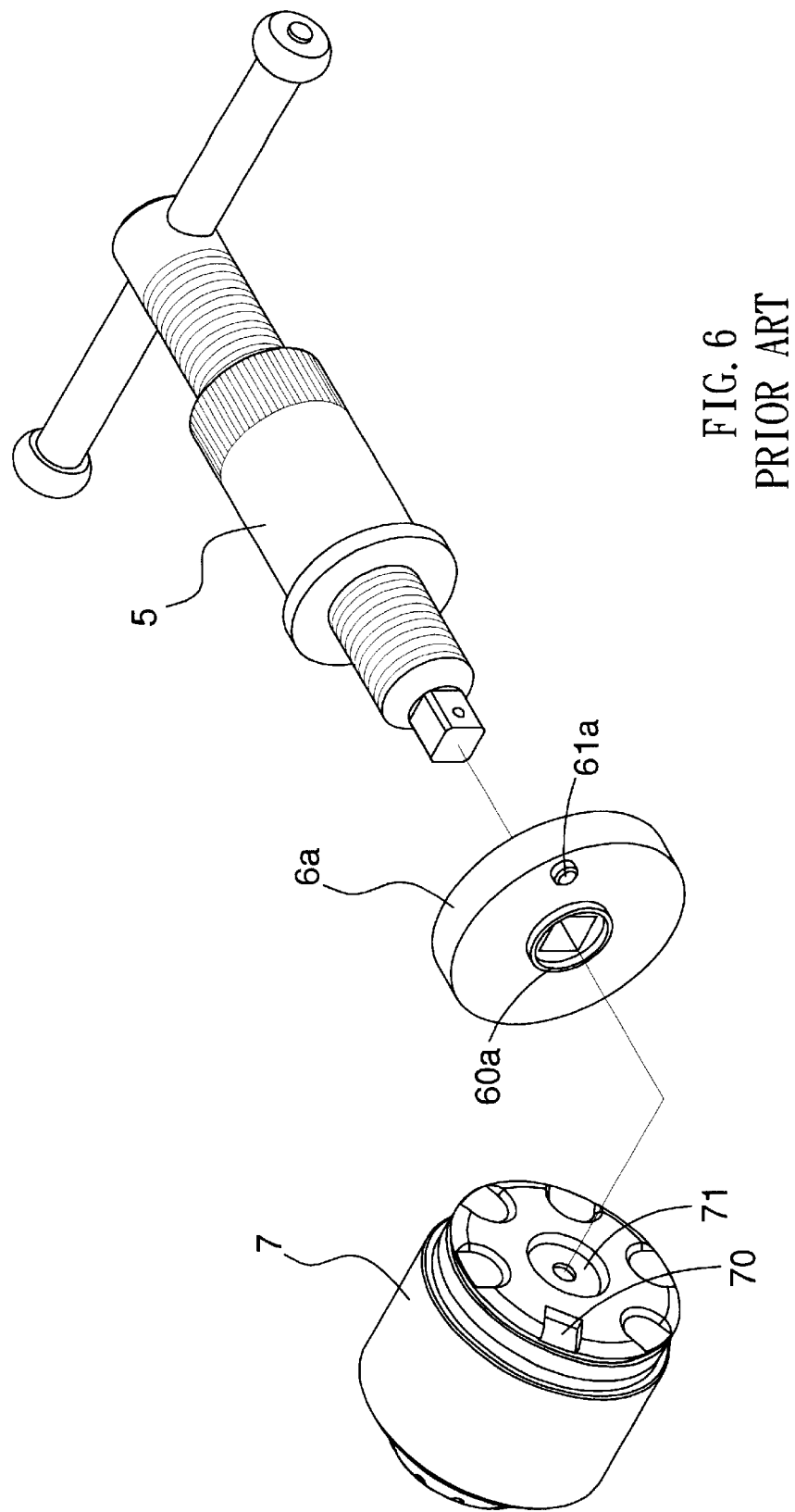
FIG. 6 is a perspective view of a conventional drive wrench structure in accordance with the prior art.

As shown in FIG. 4, when the drive wrench structure 3 is not in use, the mounting stud 33 may be rotated on the threaded rod 311 of the drive handle 31 to move outward relative to the threaded rod 311 of the drive handle 31, so that the guide rod 312 of the drive handle 31 may be retracted into and fully hidden in the mounting stud 33, thereby achieving the purpose of protecting the guide rod 312 of the drive handle 31. At this time, the positioning nut 32 may also be rotated on the threaded rod 311 of the drive handle 31 to move outward relative to the threaded rod 311 of the drive handle 31, so that the positioning nut 32 may be urged on the mounting stud 33, thereby providing a positioning effect on the mounting stud 33.

Accordingly, the drive wrench structure 3 in accordance with the present invention has the following advantages.

1. The guide rod 312 of the drive handle 31 may be inserted into the valve opening 12 of the piston 1 without detachment, thereby facilitating operation of the drive wrench structure 3, and thereby saving the manual work.

2. The guide rod 312 of the drive handle 31 may be retracted into and fully hidden in the mounting stud 33 when not in use, thereby protecting the guide rod 312 of the drive handle 31, and thereby facilitating storage of the drive wrench structure 3.

3. The guide rod 312 of the drive handle 31 is inserted into the valve opening 12 of the piston 1 to function as a fulcrum, so that the insertion stub 21 of the drive disk 2 may be moved to push the insertion recesses 10 of the piston 1 so as to rotate the piston 1.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A drive wrench structure, comprising:

a drive handle having one end provided with a threaded rod, the threaded rod having a distal end provided with a guide rod; and a mounting stud having a first side formed with a screw bore screwed on the threaded rod of the drive handle, and a second side formed with a through hole for passage of the guide rod of the drive handle, with the guide rod of the drive handle protruding outward from the through hole of the mounting stud.

2. The drive wrench structure in accordance with claim 1, further comprising a socket screwed on the drive handle, so that the drive handle may be rotated and moved in the socket.

3. The drive wrench structure in accordance with claim 1, wherein the drive handle has a second end provided with a force applying lever for facilitating rotation of the drive handle.

4. The drive wrench structure in accordance with claim 1, wherein the guide rod has a distal end formed with a tapered guide face.

5. The drive wrench structure in accordance with claim 1, further comprising a positioning nut screwed on the threaded rod of the drive handle and urged on the mounting stud, for providing a positioning effect on mounting stud.

6. The drive wrench structure in accordance with claim 1, further comprising a fixing plate mounted on the drive handle.

7. The drive wrench structure in accordance with claim 6, wherein the fixing plate is formed with a square recess.

8. The drive wrench structure in accordance with claim 6, wherein the fixing plate is formed with a semi-hexagonal recess.

* * * * *